G. S. TAKITA.
GOPHER TRAP.
APPLICATION FILED DEC. 28, 1915.
1,180,339.
Patented Apr. 25, 1916.
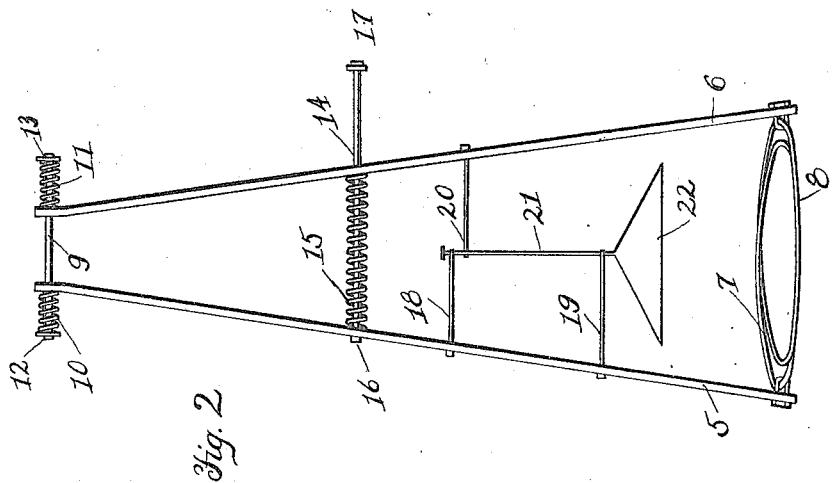
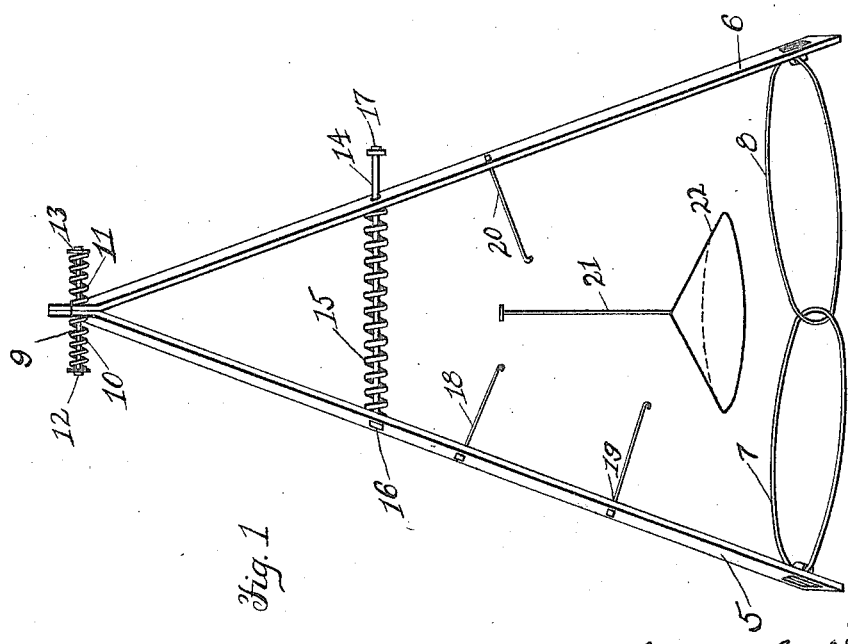
Inventor
George S. Takita
By Samuel Houck
Attorney

UNITED STATES PATENT OFFICE.

GEORGE S. TAKITA, OF EAST SCOBEY, MONTANA.

GOPHER-TRAP.

1,180,339.

Specification of Letters Patent.

Patented Apr. 25, 1916.

Application filed December 28, 1915. Serial No. 69,006.

*To all whom it may concern:*

Be it known that I, GEORGE S. TAKITA, a subject of the Emperor of Japan, residing at East Scobey, in the county of Sheridan and State of Montana, have invented certain new and useful Improvements in Gopher-Traps, of which the following is a specification.

This invention relates to animal traps and particularly to a trap for gophers and like animals that live in burrows.

The object of the invention is to provide a very simple and inexpensive trap for the above named purpose and one which will effectually do the work for which it is designed.

Further objects and advantages of the invention will be set forth in the detailed description which now follows.

In the accompanying drawing: Figure 1 is a perspective view of a gopher trap with the parts in sprung position, and Fig. 2 is a side view with the parts in the set position.

Like numerals designate corresponding parts in both of the figures of the drawing.

Referring to the drawing it will be seen that my improved animal trap comprises a pair of bars 5 and 6 carrying loops 7 and 8 at their lower ends, said loops passing through each other. A rod 9 passes through the upper ends of the bars and springs 10 and 11, disposed upon this rod, bear between the bars 5 and 6 and stops 12 and 13 of the rod 9. It will therefore be seen that the springs normally tend to force the upper ends of the bars 5 and 6 together.

A second rod 14, passes through the bars intermediate their ends and a spring 15 is disposed thereon and bears against the bars. The rod 14 carries suitable stops 16 and 17 to retain the bars 5 and 6 in place.

The bar 5 carries a pair of hooks 18 and 19 and the bar 6 carries a hook 20. These hooks, when the trap is set, engage the stem 21 of a trigger 22, the latter being of hollow, conical formation. At this time the stem 21 serves as a uniting means between the hooks 18 and 19 and the hook 20 and prevents movement of the bars 5 and 6 away from each other under the action of spring 15.

The operation of the device is as follows:—When the trap is set the loops 7 and 8 are substantially concentric with each other and with the trigger 22. The trap is placed in position over the entrance or exit of the burrow and when the gopher tries to leave the burrow his head strikes some portion of the trigger 22 and dislodges the stem from its engagement with the hooks 18, 19 and 20, whereupon the springs 10, 11 and 15 act to throw the lower ends of the bars 5 and 6 apart with the result that the gopher is caught and held between the loops 7 and 8, the opening between which constricts, as the bars move apart.

While the elements shown and described are well adapted to serve the purposes for which they are intended it is to be understood that the invention is not limited to the precise construction set forth but includes within its purview such changes as fairly come within the spirit of the appended claims.

Having described my invention what I claim is:

1. In a device of the character described, the combination with a pair of rigid bars adapted to be disposed upon end and in a vertical plane, a pair of overlapping loops carried by the lower ends of said bars, spring means bearing between said bars and normally tending to force said bars apart, a loose trigger disposed vertically above said loops which is adapted to be dislodged by lateral movement and which comprises a stem and an enlarged head disposed below said stem and members carried by said bars and releasably engaging said stem to hold the bars against movement away from each other.

2. In a device of the character described, the combination with a pair of bars, a rod passing therethrough, a spring encircling said rod and tending to thrust said bars apart, a pair of overlapping loops connected to the lower ends of said bars, a loose trigger, and members carried by said bars and engaging said trigger to thereby hold said loops in substantially concentric position.

3. A device of the character described, comprising a pair of bars, a pair of overlapping loops carried by the lower ends of said bars, a rod passing through the upper ends of said bars, springs disposed upon said rod outwardly of said bars and tending to force the upper ends of said bars together, a second rod passing through said bars intermediate of their ends, a spring carried thereby, said spring bearing outwardly between said bars and tending to force said bars apart and a trigger mechanism for preventing movement of said bars away from each other until engaged and released by an animal.

4. A device of the character described, comprising a pair of members, overlapping loops carried by said members, said loops being horizontally disposed, spring means normally tending to force said members apart, a loose trigger of hollow, conical formation, a stem carried by said trigger and hooks carried by said members for engaging said stem.

In testimony whereof I affix my signature in the presence of two witnesses.

GEORGE S. TAKITA.

Witnesses:
 WILLIS ENDSLEY,
 LOUIS J. RILEY.

Copies of this patent may be obtained for five cents each, by addressing the "Commissioner of Patents, Washington, D. C."